(Model.)

C. E. MARSHALL.
FRUIT WASHER.

No. 265,120. Patented Sept. 26, 1882.

WITNESSES:
Francis McArdle
Chas. Lurcott

INVENTOR:
Chas. E. Marshall
BY Munn & Co
ATTORNEYS.

UNITED STATES PATENT OFFICE.

CHARLES E. MARSHALL, OF LOCKPORT, NEW YORK.

FRUIT-WASHER.

SPECIFICATION forming part of Letters Patent No. 265,120, dated September 26, 1882.

Application filed June 15, 1882. (Model.)

*To all whom it may concern:*

Be it known that I, CHARLES E. MARSHALL, of Lockport, Niagara county, New York, have invented a new and Improved Fruit-Washer, of which the following is a full, clear, and exact description.

This invention relates to improvements in fruit-washers; and it consists of a vessel having a perforated false bottom, a filler, and a spout, and of a device adapted to regulate the opening of the cover of the vessel, substantially as hereinafter more fully set forth.

Reference is to be had to the accompanying drawings, forming part of this specification, in which similar letters of reference indicate corresponding parts in both figures.

Figure 1:
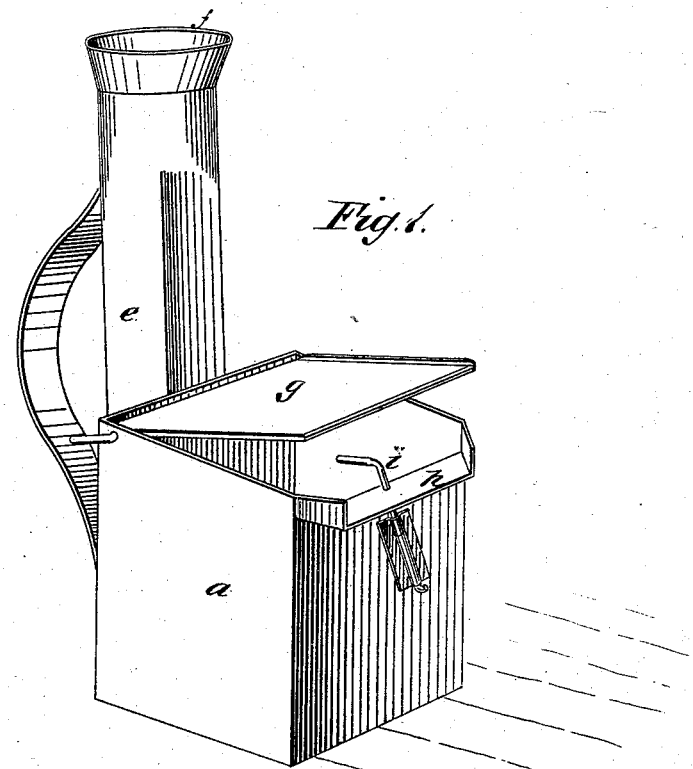
Figure 2:
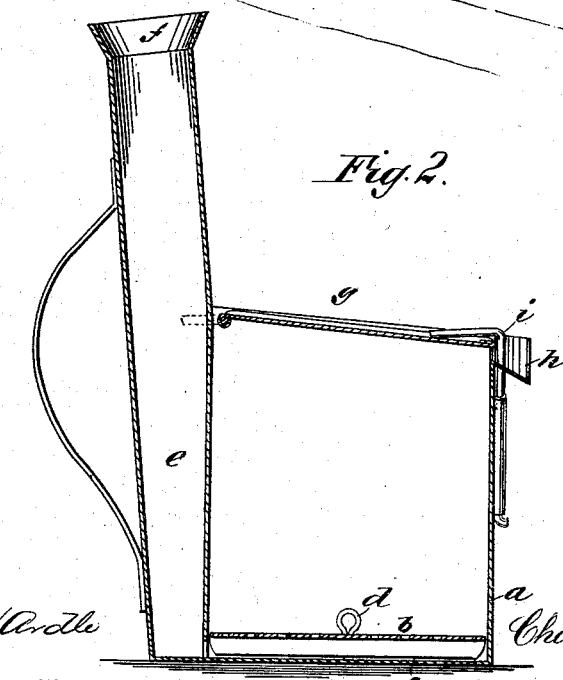

Figure 1 is a perspective view of my improved fruit-washer, and Fig. 2 is a sectional elevation.

I make a rectangular or other suitably-shaped vessel, $a$, of sheet metal or other approved material and of any required size, in which I arrange a perforated false bottom, $b$, a little above the true bottom $c$, preferring to make the said false bottom removable—say by means of an eye-stud, $d$, to be taken by the fingers or with a hook-ended rod—and to this vessel, preferably at one side, I attach a vertical spout, $e$, somewhat higher than the vessel, with a funnel-mouth, $f$, and discharging into vessel $a$ under the bottom $b$, so that water poured in at the top $f$ will rise up through the contents of the vessel with some little pressure to wash out the light matters and carry them off through spout $h$, over which the opening under cover $g$ for the escape of the water and refuse will be regulated as to its width, so as to prevent the fruit, grain, or other matters being washed away, by means of the bent hasp $i$, which, being set obliquely, as shown, will limit the opening of the cover more or less, according as the hasp is turned on its axis.

Besides the usefulness of this device for washing fruit and other articles, as above shown, it will also be serviceable for steeping purposes and for other uses in which a false bottom is desirable to prevent the contents from burning or overheating on a stove, and the cover may also act as a strainer, and the device, by removing the false bottom, will be equally as useful as an ordinary vessel for holding milk and other liquids.

Having thus described my invention, I claim as new and desire to secure by Letters Patent—

1. The combination of vessel $a$, perforated false bottom $b$, filler $e$, and spout $h$, substantially as described.

2. The combination of bent hasp $i$, arranged obliquely to the side of the vessel $a$, with cover $g$, substantially as described.

CHARLES E. MARSHALL.

Witnesses:
JAMES F. DUNHAM,
GEO. G. MOSS.